US006639911B1

(12) United States Patent
Bingham

(10) Patent No.: US 6,639,911 B1
(45) Date of Patent: Oct. 28, 2003

(54) DATA COMMUNICATIONS SYSTEM WITH SPLITTERLESS OPERATION

(75) Inventor: John A. C. Bingham, Palo Alto, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/182,940

(22) Filed: Oct. 29, 1998

Related U.S. Application Data

(60) Provisional application No. 60/080,049, filed on Mar. 31, 1998.

(51) Int. Cl.[7] .............................................. H04L 12/66

(52) U.S. Cl. ...................... 370/352; 375/222; 379/93.09

(58) Field of Search ................................ 370/277, 278, 370/352, 360, 401, 465, 466, 467; 379/93.08, 93.09, 93.31; 375/219, 220, 222, 257, 377

(56) References Cited

U.S. PATENT DOCUMENTS

| 5,349,635 | A | * | 9/1994 | Scott | 379/93.34 |
|---|---|---|---|---|---|
| 5,377,229 | A | * | 12/1994 | Wilson et al. | 375/9 |
| 5,550,881 | A | * | 8/1996 | Sridhar et al. | 375/377 |
| 5,684,825 | A | * | 11/1997 | Ko | 375/222 |
| 5,940,438 | A | * | 8/1999 | Poon et al. | 375/222 |
| 6,154,505 | A | * | 11/2000 | Konishi et al. | 375/321 |
| 6,266,348 | B1 | * | 7/2001 | Gross et al. | 370/493 |

OTHER PUBLICATIONS

American National Standards Institute (ANSI), Network and Customer Installation Interfaces—Asymmetric Digital Subscriber Line (ADSL) Metallic Interface, ANSI T1.413–1995.

* cited by examiner

Primary Examiner—Alpus H. Hsu
Assistant Examiner—Roberta Stevens
(74) Attorney, Agent, or Firm—Tammy L. Williams; W. James Brady, III; Frederick J. Telecky, Jr.

(57) ABSTRACT

A data communication system that provides different types of service (e.g., telephone services and high-speed data transmission services) to a remote site even when the remote site lacks a splitter is disclosed. A central site (e.g., central office) is able to communicate with at least two different types of remote sites. One type of remote site includes a full splitter (i.e., both low-pass and high-pass filters), and the other type of remote site has only a partial splitter (i.e., includes high-pass filter but lacks a low-pass filter). Although conventionally the transceivers (e.g., ADSL transceivers) at these remote sites would be of the same design and use the same modulation technique for upstream as for downstream transmissions, here the remote site that lacks a low-pass filter (i.e., partial splitter type remote site) uses a different modulation technique for upstream transmissions. As an example, in a data communication system where a remote site lacks a complete splitter, a high peak-average-ratio (PAR) technique like discrete multi-tone (DMT) can be used with downstream transmissions that do not lead to noise at the telephone service even in the splitterless design, and a lower PAR technique (e.g., CPM, QAM, FSK, etc.) can be used with upstream transmissions so that the noise levels produced at the telephone service are vastly reduced. The central site is able to communicate with both the different types of remote sites. The central site selects from various receiver units depending on the type of modulation (e.g., low PAR technique) used.

33 Claims, 2 Drawing Sheets

DATA COMMUNICATIONS SYSTEM WITH SPLITTERLESS OPERATION

This application claims the benefit of provisional application 60/080,049 filed Mar. 31, 1998.

BACKGROUND OF THE INVENTION

1. Field of the Invention

The present invention relates to data communication systems and, more particularly, to data communication systems that provide different services over a common channel.

2. Description of the Related Art

Often, with conventional communications systems, communication channels are shared by different devices that operate on the same channel. In conventional Asymmetric Digital Subscriber Line ("ADSL") transceivers (i.e., modems) it is common to use two pairs of "splitter" filters to separate Plain Old Telephone Service (POTS) and ADSL services that operate on the same line. One pair of the splitter filters is provided at the central side and the other pair is provided at the remote side. Each pair of splitter filters includes a low pass filter that passes signals to the POTS and a high-pass filter that passes signals to the ADSL services.

FIG. 1 is a block diagram of a data communication system 10 in which a communication channel (i.e., line) supports both POTS and ADSL services. The data communication system 10 includes a central side 12 and a remote side 14. The central side 12 is, for example, a central office, and the remote side 14 is, for example, associated with a customer's premises (e.g., business or residential premises).

The central side 12 includes a DMT transceiver 16 and a telephone network 18. The DMT transceiver 16 includes a DMT transmitter 20, a DMT receiver 22, and a hybrid circuit 24. The DMT transmitter 20 operates to transmit data over the channel through the hybrid circuit 24. The DMT receiver 22 operates to receive data that has been transmitted over the channel and received through the hybrid circuit 24. The central side 12 also includes a splitter 26 (i.e., pair of splitter filters) that passes lower frequency signals incoming over a line 28 to the telephone network 18 and passes higher frequency signals incoming over the line 28 to the hybrid circuit 24.

The remote side 14 includes a DMT transceiver 30 and a customer telephone service 32. The DMT transceiver 30 includes a DMT receiver 34, a DMT transmitter 36 and a hybrid circuit 38. The remote side 14 also includes a splitter 40 (i.e., pair of splitter filters) that is coupled to the line 28 as well as to the customer telephone service 32 and the hybrid circuit 38. The splitter 40 operates to pass incoming signals from the line 28 to either the hybrid circuit 38 or the customer telephone service 32. If the incoming signals over the line 28 are low frequency signals, then the splitter 40 forwards the signals to the customer telephone service 32. On the other hand, if the incoming signals over the line 28 are higher frequency signals, the splitter 40 forwards the signals to the hybrid circuit 38 of the transceiver 30.

Accordingly, the data communications system 10 is able to provide ADSL and POTS services over the same line (i.e., the line 28). The splitters 26 and 40 operate to filter the differing services appropriately so as to direct signals to the proper service. Additional details on ADSL can be found in American Nationals Standard Institution (ANSI) published standard ANSI T1.413-1995 pertaining to Network and Customer Installation Interfaces—Asymmetric Digital Subscriber Lines (ADSL) Metallic Interface, which is hereby incorporated by reference.

There are, however, several problems associated with the conventional design of the data communication systems supporting multiple services over a common communication channel. One problem of a remote ADSL transceiver (such as the remote transceiver 30 illustrated in FIG. 1) is that a low-pass filter associated with the splitter (e.g., the splitter 40) needs to be installed near the entrance of the line (e.g., the line 28) to the customer's premises. As noted above, the design of the splitter includes two filters (i.e., splitter filters), one filter (high-pass filter) is formed in or coupled to the transceiver (i.e., the transceiver 30) and the other filter (low-pass filter) is installed at the entrance of the line to the customer's premises. The installation of such a filter (i.e., low-pass filter) at the customer's premises is inconvenient and burdensome to both customers and telephone service providers.

Some data communication systems have tried to remove the low-pass filter associated with the splitter at the remote side. While this avoids the inconvenience and burden of having to install the low-pass filter at the customer's premises, doing so causes high levels of noise to be generated at the telephone at the customer's premise which impedes its use and is otherwise unsatisfactory to users. More particularly, in the case of ADSL transceivers using discrete multi-tone (DMT) modulation, when a customer transmits data upstream (i.e., toward a central office) using a DMT modulation technique without having a low-pass filter of the splitter at the customer's premises, non-linearities in the circuitry of many telephones can cause intolerably high levels of noise to be generated by the telephone's speaker and heard in the telephone's earpiece.

Another approach that has been proposed to solve the noise problem that results in an ADSL system without the low-pass filter associated with the splitter at the customer's premises is to transmit at lower power levels or use a less effective modulation technique. Transmitting at lower power levels significant drops the available data rates that can be supported. While DMT modulation does (at high power levels) provided high data rates, it uses high frequency signals that have high signal strengths. These resulting high signal strengths, as noted above, give rise to the undesired noise at the customer's telephones. A less effective modulation technique would use signals that have lower signal strengths or frequencies and thus produce less noise. However, the use of a less effective modulation technique in place of DMT also reduces the performance of the system in terms of its available data rate.

Thus, there is a need for improved techniques that allow telephone service and ADSL service to operate on the same line without requiring a low-pass filter portion of a splitter at a customer location.

SUMMARY OF THE INVENTION

The invention relates to a data communication system that provides different types of service to a remote site even when the remote site lacks a splitter. A central site (e.g., central office) is able to communicate with at least two different types of remote sites. One type of remote site includes a full splitter (i.e., both low-pass and high-pass filters), and the other type of remote site has only a partial splitter (i.e., includes high-pass filter but lacks a low-pass filter). Although conventionally the transceivers (e.g., ADSL transceivers) at these remote sites would be of the same design and use the same modulation technique for upstream as for downstream transmissions, here the remote site that lacks a low-pass filter (i.e., partial splitter type remote site)

uses a different modulation technique for upstream transmissions. As an example, the remote site without a complete splitter could use continuous phase modulation (CPM) for upstream transmissions and discrete multi-tone (DMT) for downstream transmissions. More generally, while a high peak-average-ratio (PAR) technique like DMT can be used on downstream transmissions that do not lead to noise at the telephone service even in the splitterless design, a lower PAR technique (e.g., CPM, QAM, FSK, etc.) can be used on the upstream transmissions so that the noise levels produced at the telephone service are vastly reduced. The central site is able to communicate with both the different types of remote sites. The central site selects from various receiver units depending on the type of modulation (e.g., low PAR technique) used by the remote sites.

The invention can be implemented in numerous ways, including as an apparatus, system, method, or computer readable media. Several embodiments of the invention are discussed below.

As a transceiver apparatus for data communications over a wire, an embodiment of the invention includes: a transmitter that provides data transmission service using a high PAR type modulation to transmit data; a first receiver capable of demodulating signals having a high PAR type demodulation to receive data; a second receiver capable of demodulating signals having a low or intermediate PAR type demodulation to receive data; and a switch unit operatively connected to select one of the first and second receivers to receive the incoming data transmission service communications from the wire.

As a data communication system that shares transmission lines for both telephone service and data transmission service, one embodiment of the invention includes a central side for providing the telephone service and the data transmission service, and a remote side for providing the telephone service and the data transmission service. The remote side couples to a telephone service device. The central side includes: a central-side transmitter that provides data transmission service using first type modulation to transmit data; a central-side receiver that provides data transmission service configured to use either first type demodulation or second type demodulation to receive data; and a splitter circuit coupled to a transmission line. The splitter circuit directs incoming telephone service communications over the transmission line to a telephone network and directs incoming data transmission service communications over the transmission line to the central-side receiver, and couples outgoing telephone service communications and outgoing data transmission service communications to the transmission line. The remote side includes: a remote-side receiver that provides data transmission service using first type demodulation to receive data; and a remote-side transmitter that provides data transmission service using either first type modulation or second type modulation to transmit data. When the remote-side transmitter provides data transmission service using first type modulation, the central-side receiver is configured to use first type demodulation, and when the remote-side transmitter provides data transmission service using second type modulation, the central-side receiver is configured to use second type demodulation.

As a data communication system that shares transmission lines for both telephone service and high-speed data transmission service, another embodiment of the invention includes: a central side for providing the telephone service and the high-speed data transmission service, and a first remote side for providing the telephone service and the high-speed data transmission service. The remote side couples to a telephone service device. The central side includes: a central-side transmitter that provides high-speed data transmission service using first type modulation to transmit data; a central-side first receiver that provides high-speed data transmission service using first type demodulation to receive data; a central-side second receiver that provides high-speed data transmission service using second type demodulation to receive data; a switch unit operatively connected to select one of the central-side first receiver and the central-side second receiver to receive the incoming high-speed data transmission service communications; and a splitter circuit that directs incoming telephone service communications over the transmission line to a telephone network and directs incoming high-speed data transmission service communications over the transmission line to the switch unit, and couples outgoing telephone service communications and outgoing high-speed data transmission service communications to the transmission line. The first remote side includes: a high-pass filter circuit that passes the incoming high-speed data transmission service communications from the transmission line and blocks the telephone service communications from the transmission line; a remote-side first receiver that provides high-speed data transmission service using first type demodulation to receive data; and a remote-side first transmitter that provides high-speed data transmission service using second type modulation to transmit data. Preferably, the remote side lacks a low-pass filter circuit coupled to the telephone service device. Optionally, the first type modulation uses discrete multi-tone modulation and the first type demodulation uses discrete multi-tone modulation, and the second type modulation uses continuous phase modulation and the second type demodulation uses continuous phase demodulation.

As a data communication system that shares transmission lines for both telephone service and high-speed data transmission service, still another embodiment of the invention includes: a central side for providing the telephone service and the high-speed data transmission service, and a remote side for providing the telephone service and the high-speed data transmission service, the remote side couples to a telephone service device. The central side includes: a central-side DMT transmitter that provides high-speed data transmission service using multicarrier modulation to transmit data; a central-side DMT receiver that provides high-speed data transmission service using multicarrier demodulation to receive data; a central-side CPM receiver that provides high-speed data transmission service using continuous phase demodulation to receive data; a splitter circuit coupled to a transmission line, the splitter circuit directs incoming telephone service communications over the transmission line to a telephone network and directs incoming high-speed data transmission service communications over the transmission line to the central-side DMT transceiver, and couples outgoing telephone service communications and outgoing high-speed data transmission service communications to the transmission line; and a switch unit operatively connected to select one of the central-side DMT receiver and the central-side CPM receiver to receive the incoming high-speed data transmission service communications from the transmission line. The remote side includes: a filter circuit operatively coupled to the transmission line, the filter circuit passes the incoming high-speed data transmission service communications from the transmission line and blocks the telephone service communications from the transmission line; a remote-side DMT receiver operatively coupled to the filter circuit, the remote-side DMT receiver provides high-speed data transmission service using multicarrier demodulation to receive data; and a remote-side CPM transmitter operatively coupled to the filter circuit, the remote-side CPM transmitter provides high-speed data transmission service using continuous phase modulation to transmit data.

The advantages of the invention are numerous. One advantage of the invention is that undesirable noise level that conventionally appears in telephones when the remote side uses splitterless operation are eliminated or substantially reduced by the invention. Another advantage is that the central side can support either splitter or splitterless operation with a common design, the receiver(s) in the central-side are simply configured for respective remote sites depending on whether the remote site has a splitter or not (or depending on the modulation technique utilized). Yet another advantage is that by using hybrid transceivers with splitterless operation, the downstream transmissions continue to use higher performance modulation techniques (e.g., DMT), whereas upstream communications can use a modulation technique with less performance (e.g., CPM) to reduce the undesired noise.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to a data communication system that provides different types of service to a remote site even when the remote site lacks a splitter. A central site (e.g., central office) is able to communicate with at least two different types of remote sites. One type of remote site includes a full splitter (i.e., both low-pass and high-pass filters), and the other type of remote site has only a partial splitter (i.e., includes high-pass filter but lacks a low-pass filter). Although conventionally the transceivers (e.g., ADSL transceivers) at these remote sites would be of the same design and use the same modulation technique for upstream as for downstream transmissions, here the remote site that lacks a low-pass filter (i.e., partial splitter type remote site) uses a different modulation technique for upstream transmissions. As an example, the remote site without a complete splitter could use continuous phase modulation (CPM) for upstream transmissions and discrete multi-tone (DMT) for downstream transmissions. More generally, while a high peak-average-ratio (PAR) technique like DMT can be used on downstream transmissions that do not lead to noise at the telephone service even in the splitterless design, a lower PAR technique (e.g., CPM, QAM, FSK, etc.) can be used on the upstream transmissions so that the noise levels produced at the telephone service are vastly reduced. The central site is able to communicate with both the different types of remote sites. The central site selects one of two receiver units depending on the type of modulation (e.g., low PAR technique) used by the remote sites.

Figure 1:
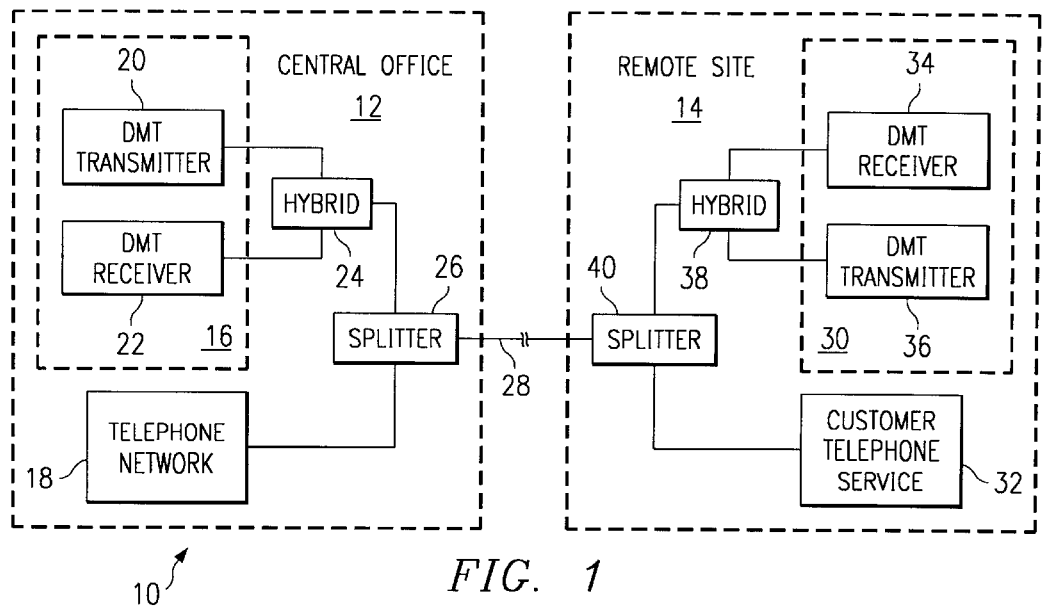
FIG. 1 is a block diagram of a data communication system in which a communication channel supports different services.
Figure 2:
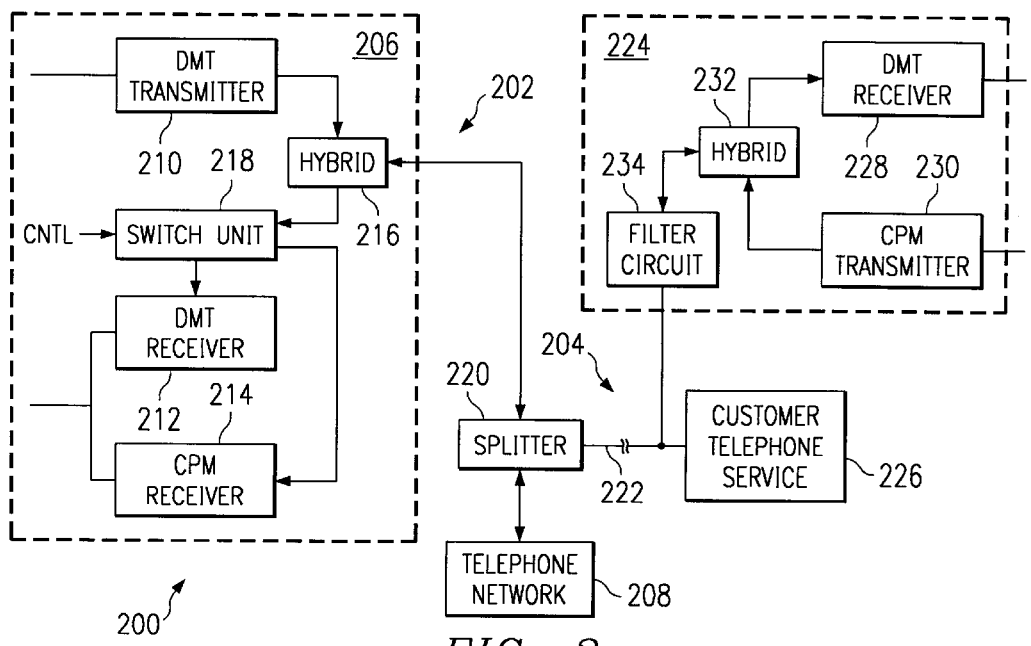
FIG. 2 is a block diagram of a data communications system according to an embodiment of the invention.

The partial splitter design at a remote site is still referred to as being a splitterless design or having a splitterless operation even though the remote site can include a high-pass filter. In other words, the design or operation is splitterless because all incoming signals to the remote site are received at telephone services. In a splitter design or operation, the incoming signals are split such that some are delivered to the data services while other delivered to telephone services. FIG. 2 is a block diagram of a data communications system 200 according to an embodiment of the invention. The data communications system 200 includes a central side 202 and a remote side 204.

The central side 202 of the data communications system 200 includes a multi-modulation type transceiver 206 and a telephone network 208. The multi-modulation type transceiver 206 includes a DMT transmitter 210, a DMT receiver 212, a CPM receiver 214, a hybrid circuit 216 and a switch unit 218. Signals transmitted by the DMT transmitter 210 are supplied to a hybrid circuit 216. The hybrid circuit 216 then forwards the outgoing signals to a splitter 220. The splitter 220 then couples the outgoing signals to a line 222.

Incoming data signals from the line 222 that are destined to the multi-modulation type transceiver 206 are directed by the splitter 220 to the hybrid circuit 216. The splitter 220 includes at least one frequency-based filter that directs (or splits) the incoming data signals such that high-frequency signals are directed to the hybrid circuit 216 of the multi-modulation type transceiver 206 and low-frequency signals are directed to the telephone network 208.

In the case of the high-frequency signals, the hybrid circuit 216 then forwards these incoming data signals to the switch unit 218. The switch unit 218 then operates to forward the incoming signals to either the DMT receiver 212 or the CPM receiver 214. A control signal (CNTL) supplied to the switch unit 218 determines whether the switch unit 218 directs the incoming signals to the DMT receiver 212 or the DMT transmitter 210. The selected one of the DMT receiver 212 and the CPM receiver 214 then operates to recover the associated transmitted data by performing demodulation and other common communication processing techniques.

The telephone network 208 is also coupled to the splitter 220. Hence, incoming signals (i.e., low-frequency signals) from the line 222 can be forwarded by the splitter 220 to the telephone network 208 when they pertain to the telephone service.

The remote side 224 is connected to the central side 202 by the line 222. The remote side 204 includes a transceiver 224 and a customer telephone service 226. The transceiver 224 includes a DMT receiver 228, a CPM transmitter 230, a hybrid circuit 232 and a filter circuit 234. The filter circuit 234 allows high-frequency signals to pass to and from the line 222 and the hybrid circuit 232. Incoming signals to the remote side 204 from the central side 202 over the line 222 that have high frequencies are coupled to the filter circuit 234 then onto the hybrid circuit 232. The hybrid circuit 232 then directs the incoming signals to the DMT receiver 228.

The DMT receiver 228 then performs the demodulation and other conventional processing tasks to recover the transmitted data. Hence, the DMT transmitter 210 in the central side and the DMT receiver 228 in the remote side form a transmitter-receiver pair.

Outgoing signals from the CPM transmitter 230 are also supplied to the hybrid circuit 232. Since these outgoing signals are also high frequency signals, the hybrid circuit 232 then couples the outgoing signals to the line 222 through the filter circuit 234. In this case, the CPM transmitter 230 and the CPM receiver 214 form a transmitter-receiver pair.

The customer telephone service 226 is also coupled to the line 222. The customer telephone service 226, for example, can include the internal telephone wiring in a business or home together with at least one telephone. Hence, the customer telephone service 226 provides conventional telephone service to a customer's premises through use of a telephone. A customer at the customer's premises is thus able to use the telephone in the normal fashion.

Accordingly, in the embodiment illustrated in FIG. 2, the line 222 is able to provide not only ADSL services using transceivers at central and remote sides but also provides telephone service using the telephone network and associated telephones. However, the data communications system 200 illustrated in FIG. 3 has a splitterless operation at the remote side because no splitter, namely, no low pass filter, is provided at the remote side 204. While the remote transceiver 224 can include the filter circuit 234 to provide a high-frequency filter, the remote side 204 is still referred to as being a splitterless design or having a splitterless operation. In other words, the design or operation is splitterless because all incoming signals to the remote side 204 are received at the customer telephone service 226. In a splitter design or operation, the incoming signals are split such that some are delivered to the data services while other delivered to telephone services.

Figure 3:
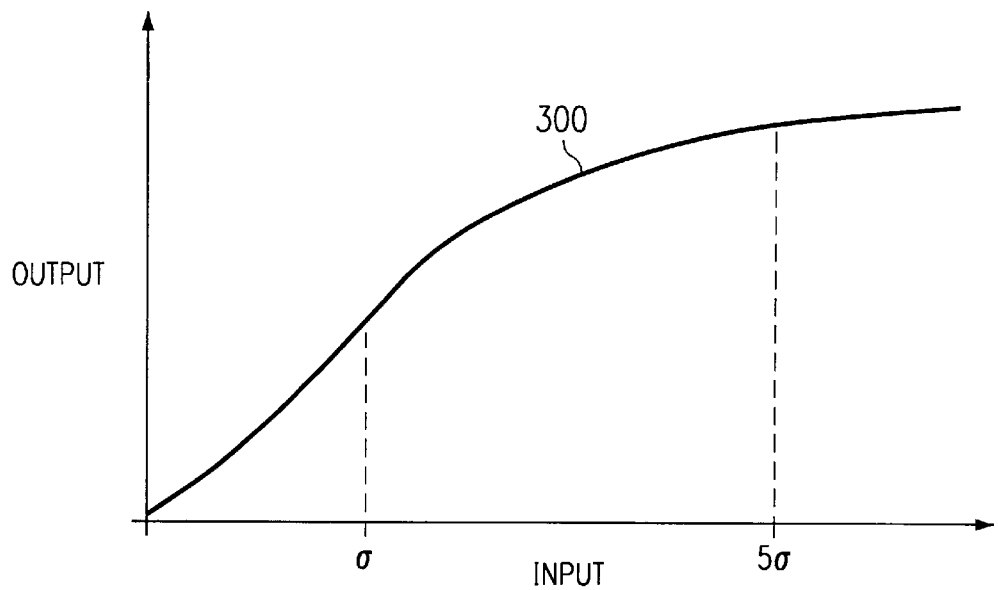
FIG. 3 illustrates a curve of typical output/input characteristics of some telephones.

FIG. 3 illustrates a curve 300 of typical output/input characteristics of some telephones. FIG. 3 is used in explaining how the invention reduces the undesirable noise that results in a telephone when the customer's premises lacks a splitter (i.e., the low-pass filter). The output/input characteristics illustrated in FIG. 3 could, for example, pertain to signal magnitude or signal power, but hereafter signal strength is used. It should be noted that at lower levels of input and output signal strengths, the output versus input characteristics are essentially linear, whereas at higher levels the output versus input characteristics are non-linear. If a DMT transceiver were used at the remote side, the signal strength of the transmitted signals would be on a non-linear portion of the curve 300 (see reference level 5σ illustrated in FIG. 3). It is these non-linearities of the conventional phones that cause the high-frequency signals from the DMT transmitter to produce intolerable amounts of noise in the telephone when the remote side is splitterless.

Thus, conventionally, the DMT transmitter operates in the higher signal strength range where the curve is non-linear. By using a CPM transmitter at the remote side 204 within the remote transceiver 224, the transmission levels appearing on the line 222 from the CPM transmitter 230 are approximately represented by the linear portion of the curve 300 (see reference level σ illustrated in FIG. 3). As shown in FIG. 3, at this level which is one-fifth that of 5σ, the curve 300 is substantially linear. With such linear conditions, the noise levels that are generated by at the telephone due to the high-frequency data transmissions from the remote transceiver 224 are minimal and deemed acceptable. Accordingly, the invention provides a solution to the above-mentioned burdensome problem in an effective manner.

Still further, at the central side 202, the transceivers 206 and 224 provide a multi-modulation type of operation. Namely, the data communication system 200 can support not only a receiver that uses a different, non-DMT modulation scheme but also a DMT modulation scheme for upstream communications. For downstream communications, the DMT modulation scheme is used. Hence, the multi-modulation type transceiver 206 is able to switch or configure its receiver to demodulate in the appropriate manner depending upon whether the particular remote transmitter's modulation type. Hence, in the case of remote transceiver 224, the multi-modulation type transceiver 206 would cause the switch unit 218 to direct incoming signals over the line 222 from the CPM transmitter 230 to the CPM receiver 214. Alternatively, if the remote transceiver were instead a DMT transmitter as is common with, for example, ADSL, then the multi-modulation type transceiver 206 would cause the switch unit 218 to direct incoming signals over the line 222 to the DMT receiver 212.

Further, it is desirable to have the remote side 204 loop-timed with the central side 202, and also to have the CPM transmitter 230 frequency locked to the receive data received by the DMT receiver 228. In this way, the central side 202 and the remote side 204 can remain frequency synchronized regardless of whether the remote side uses a CPM transmitter or a DMT transmitter.

Still further, is it desirable to have the CPM transmitter 230 use one of the DMT subcarriers as its carrier frequency. When the carrier frequency for the CPM transmitter 230 is chosen to be one of the DMT subcarriers near the center of the DMT frequency band, then the frequency band used by the CPM transmissions can be roughly the same as that used by DMT transmissions.

The signal-to-noise ratio (SNR) performance of a data communication system using CPM with only four phases (C4PM) is about the same as any other modulation method that transmits 2 bits/s/Hz, but as the number of bits/s/Hz is increased the relative performance of CPM deteriorates. A probable practical limit of such an approach might be 16-phase CPM (C16PM) which is capable of transmitting 4 bits/s/Hz. The C16PM is about 4.2 dB inferior to the C4PM approach but offers double the data transfer rate.

The maximum available bandwidth of the upstream channel is approximately 80 kHz, and it would be desirable on loops with low noise and interference to transmit 384 kbit/s to support data services such as video conferencing. Such a data rate would require 5 bits/s/Hz. An optional system would therefore allow for C16PM with two levels of amplitude superimposed which could transmit the 5 bits/s/Hz. Such a system would be only 1.9 dB inferior in performance to 32-point quadrature modulation (QAM) or DMT. Other possible modulation methods besides CPM that offer a low PAR are: staggered QAM, frequency shift keying (FSK), continuous phase FSK, and minimum frequency shift keying (MSK).

Figure 4:
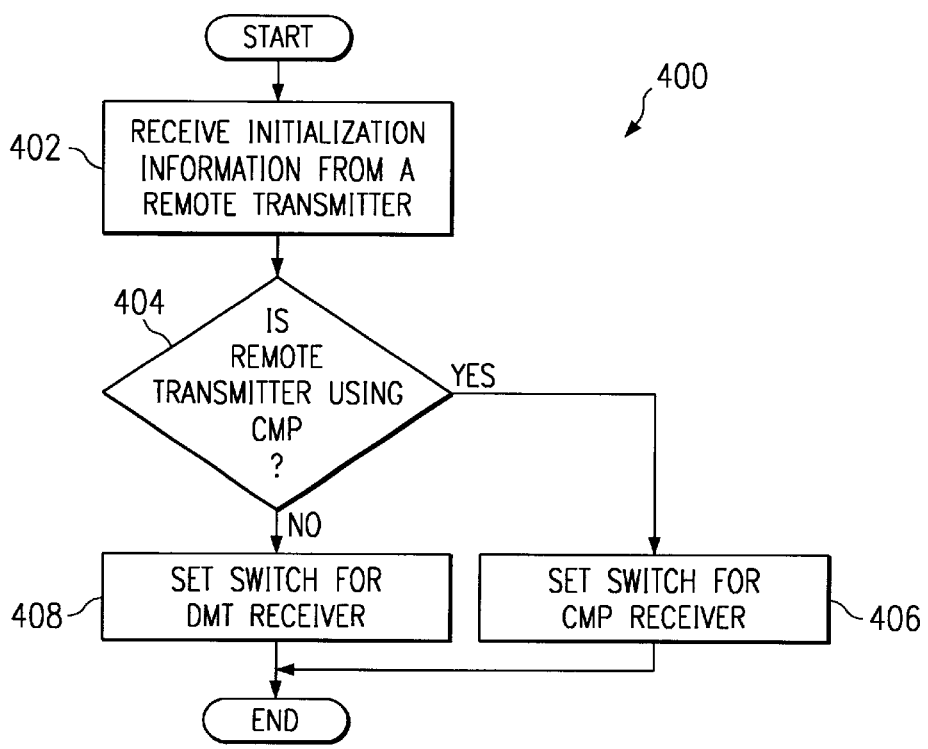
FIG. 4 is a flow diagram of a portion of central-side transceiver initialization processing according to an embodiment of the invention.

FIG. 4 is a flow diagram of a portion of central-side transceiver initialization processing 400 according to an embodiment of the invention. The portion of the initialization processing 400 illustrated in FIG. 4 represents the particular portion of initialization that would be utilized by the present invention in detecting whether a particular remote transceiver desires to transmit to the central side using a lower peak-average-ratio (PAR) modulation scheme (e.g., CPM) than a DMT modulation scheme that has a relatively high PAR. Other parts of initialization processing are known in the art, see the ANSI Standard for ADSL referenced below.

The initialization processing 400 initially receives 402 initialization information from a remote transmitter. Next, the central-side transceiver determines whether the remote transmitter is using or desires to use CPM type modulation in transmitting the data to the central side performing the initialization processing. The decision block 404 can, for example, be performed by a controller (not shown) associated with the central-side transceiver. When the decision block 404 determines that the remote transmitter is using or desires to use CPM type modulation, then a switch can be set 406 for selection of a CPM receiver (e.g., the CPM receiver 214) at the central side. On the other hand, when the decision block 404 determines that the remote receiver is not using or desirous of using CPM type modulation, then a switch can be set 408 for selection of a DMT receiver (e.g., the DMT receiver 212). Following blocks 406 or 408, the portion of the initialization processing 400 is complete and ends.

Additional details on data communications can be found, for example, in U.S. Pat. No. 5,479,447; 5,596,604; 5,623,513; and 5,627,863, which are hereby incorporated by reference. Additional details on ADSL can be found in American Nationals Standard Institution (ANSI) published standard ANSI T1.413-1995 pertaining to Network and Customer Installation Interfaces—Asymmetric Digital Subscriber Lines (ADSL) Metallic Interface, which is hereby incorporated by reference.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A data communication system that shares transmission lines for both telephone service and data transmission service, said data communication system comprising:

a central side for providing the telephone service and the data transmission service, said central side including, a central-side transmitter that provides data transmission service using first type modulation to transmit data;

a central-side receiver that provides data transmission service configured to use either first type demodulation or second type demodulation to receive data;

a splitter circuit coupled to a transmission line, said splitter circuit directs incoming telephone service communications over the transmission line to a telephone network and directs incoming data transmission service communications over the transmission line to said central-side receiver, and couples outgoing telephone service communications and outgoing data transmission service communications to the transmission line; and and a remote side for providing the telephone service and the data transmission service, said remote side couples to a telephone service device, said first remote side includes, a remote-side receiver operatively coupled to the transmission line, said remote-side receiver provides data transmission service using first type demodulation to receive data; and a remote-side transmitter operatively coupled to the transmission line, said remote-side transmitter provides data transmission service using either first type modulation or second type modulation to transmit data, wherein when said remote-side transmitter provides data transmission service using first type modulation, then said central-side receiver is configured to use first type demodulation, and wherein when said remote-side transmitter provides data transmission service using second type modulation, then said central-side receiver is configured to use second type demodulation.

2. A data communication system as recited in claim 1, wherein said remote side further includes a filter circuit operatively connected between the transmission line and said remote-side transmitter and receiver, said filter circuit passes the incoming data transmission service communications over the transmission line to said remote-side receiver and blocks the telephone service communications on the transmission line from said remote-side receiver.

3. A data communication system as recited in claim 1, wherein first type modulation provides greater data transmission rates than second type modulation, and first type modulation uses signals having a greater peak-to-average ratio than signals using second type modulation.

4. A data communication system as recited in claim 1, wherein first type modulation provides greater data transmission rates than second type modulation, and first type modulation uses higher peak-to-average ratio signals and second type modulation uses lower peak-to-average ratio signals.

5. A data communication system as recited in claim 1, wherein said remote side has a splitterless operation with respect to the customer telephone service.

6. A data communication system as recited in claim 4, wherein said remote side has a splitterless operation with respect to the customer telephone service.

7. A data communication system as recited in claim 6, wherein first type modulation provides greater data transmission rates than second type modulation, and first type modulation uses higher peak-to-average ratio signals and second type modulation uses lower peak-to-average ratio signals, and wherein by said remote-side transmitter using second type modulation in transmitting data to said central side over the transmission line substantially less noise is generated at the customer telephone service device than would otherwise be produced had first type modulation been used even though said remote-side has the splitterless operation.

8. A data communication system as recited in claim 7, wherein said remote side is loop-timed with respect to said central side, and wherein said remote-side transmitter is frequency locked to the receive data received by said remote-side receiver.

9. A data communication system as recited in claim 8, wherein the first type modulation uses a plurality of subcarrier frequencies in transmitting data, and wherein said remote-side transmitter uses one of the subcarrier frequencies as its carrier frequency.

10. A data communication system as recited in claim 1, wherein said central-side includes a plurality of said central-side transmitters and a plurality of central-side receivers arranged in pairs, and wherein said remote-side includes a plurality of remote sites that are services by said central-side, and each of said remote sites includes said remote-side transmitter using first type modulation when said remote side has a splitter operation, and otherwise each of said remote sites includes said remote-side transmitter using second type modulation when said remote site has a splitterless operation.

11. A data communication system as recited in claim 10, wherein the first type modulation uses discrete multi-tone modulation, and the first type demodulation uses discrete multi-tone modulation, and wherein the second type modulation uses continuous phase modulation, and the second type demodulation uses continuous phase de modulation.

12. A data communication system as recited in claim 11, wherein the second type modulation uses continuous phase modulation with a plurality of amplitude levels.

13. A data communication system that shares transmission lines for both telephone service and high-speed data transmission service, said data communication system comprising:

a central side for providing the telephone service and the high-speed data transmission service, said central side including, a central-side transmitter that provides high-speed data transmission service using first type modulation to transmit data;

a central-side first receiver that provides high-speed data transmission service using first type demodulation to receive data;

a central-side second receiver that provides high-speed data transmission service using second type demodulation to receive data;

a switch unit operatively connected to select one of said central-side first receiver and said central-side second receiver to receive the incoming high-speed data transmission service communications; and a splitter circuit coupled to a transmission line and said switch unit, said splitter circuit directs incoming telephone service communications over the transmission line to a telephone network and directs incoming high-speed data transmission service communications over the transmission line to said switch unit, and couples outgoing telephone service communications and outgoing high-speed data transmission service communications to the transmission line; and and a first remote side for providing the telephone service and the high-speed data transmission service, said remote side couples to a telephone service device, said first remote side includes, a high-pass filter circuit operatively coupled to the transmission line, said high-pass filter circuit passes the incoming high-speed data transmission service communications from the transmission line and blocks the telephone service communications from the transmission line;

a remote-side first receiver operatively coupled to said high-pass filter circuit, said remote-side first receiver provides high-speed data transmission service using first type demodulation to receive data; and a remote-side first transmitter operatively coupled to said high-pass filter circuit, said remote-side first transmitter provides high-speed data transmission service using second type modulation to transmit data.

14. A data communication system as recited in claim 13, wherein the first type modulation uses discrete multi-tone modulation, and the first type demodulation uses discrete multi-tone modulation.

15. A data communication system as recited in claim 14, wherein the second type modulation uses continuous phase modulation, and the second type demodulation uses continuous phase demodulation.

16. A data communication system as recited in claim 14, wherein the second type modulation uses continuous phase modulation with a plurality of amplitude levels.

17. A data communication system as recited in claim 13, wherein said switch unit is controlled by a control signal.

18. A data communication system as recited in claim 13, wherein the remote side lacks a splitter circuit.

19. A data communication system as recited in claim 13, wherein said data communication system further comprises:

a second remote side for providing the telephone service and the high-speed data transmission service, said remote side couples to a telephone service device, said second remote side includes, a remote-side receiver that provides high-speed data transmission service using first type demodulation to receive data;

a remote-side transmitter that provides high-speed data transmission service using first type modulation to transmit data; and a splitter circuit coupled between a transmission line and said remote-side receiver and transmitter, said splitter circuit directs incoming telephone service communications over the transmission line to the telephone services device and directs incoming high-speed data transmission service communications over the transmission line said remote-side receiver, and couples outgoing telephone service communications and outgoing data transmission service communications to the transmission line.

20. A data communication system as recited in claim 19, wherein said central-side transmitter and said remote-side receiver of the first and second remote sides use multicarrier modulation/demodulation.

21. A data communication system as recited in claim 20, wherein the first type modulation uses discrete multi-tone modulation, and the first type demodulation uses discrete multi-tone modulation.

22. A data communication system as recited in claim 21, wherein the second type modulation uses continuous phase modulation, and the second type demodulation uses continuous phase demodulation.

23. A data communication system as recited in claim 13, wherein said first remote side is loop-timed with respect to said central side, and wherein said remote-side first transmitter is frequency locked to the receive data received by said remote-side first receiver.

24. A data communication system as recited in claim 23, wherein the first type modulation uses a plurality of subcarrier frequencies in transmitting data, and wherein said remote-side transmitter uses one of the subcarrier frequencies as its carrier frequency.

25. A data communication system as recited in claim 13, wherein the first type modulation uses a plurality of subcarrier frequencies in transmitting data, and wherein said remote-side transmitter uses one of the subcarrier frequencies as its carrier frequency.

26. A data communication system that shares transmission lines for both telephone service and high-speed data transmission service, said data communication system comprising:
- a central side for providing the telephone service and the high-speed data transmission service, said central side including,
  - a central-side DMT transmitter that provides high-speed data transmission service using multicarrier modulation to transmit data;
  - a central-side DMT receiver that provides high-speed data transmission service using multicarrier demodulation to receive data;
  - a central-side CPM receiver that provides high-speed data transmission service using continuous phase demodulation to receive data;
  - a splitter circuit coupled to a transmission line, said splitter circuit directs incoming telephone service communications over the transmission line to a telephone network and directs incoming high-speed data transmission service communications over the transmission line to said central-side DMT transceiver, and couples outgoing telephone service communications and outgoing high-speed data transmission service communications to the transmission line; and
  - a switch unit operatively connected to select one of said central-side DMT receiver and said central-side CPM receiver to receive the incoming high-speed data transmission service communications from the transmission line; and
- a remote side for providing the telephone service and the high-speed data transmission service, said remote side couples to a telephone service device, said remote side includes,
  - a filter circuit operatively coupled to the transmission line, said filter circuit passes the incoming high-speed data transmission service communications from the transmission line and blocks the telephone service communications from the transmission line;
  - a remote-side DMT receiver operatively coupled to said filter circuit, said remote-side DMT receiver provides high-speed data transmission service using multicarrier demodulation to receive data; and
  - a remote-side CPM transmitter operatively coupled to said filter circuit, said remote-side CPM transmitter provides high-speed data transmission service using continuous phase modulation to transmit data.

27. A data communication system as recited in claim 26, wherein said remote side is loop-timed with respect to said central side, and wherein said remote-side CPM transmitter is frequency locked to the receive data received by said remote-side DMT receiver.

28. A data communication system as recited in claim 26, wherein said remote-side CPM transmitter uses one of the DMT subcarriers as its carrier frequency.

29. A transceiver apparatus for data communications over a wire, said apparatus comprising:
- a transmitter that provides data transmission service using a high PAR type modulation to transmit data;
- a first receiver capable of demodulating signals having a high PAR type demodulation to receive data;
- a second receiver capable of demodulating signals having a low or intermediate PAR type demodulation to receive data; and
- a switch unit operatively connected to select one of said first and second receivers to receive the incoming data transmission service communications from the wire;
- wherein said transceiver operates in a data communications system that provides data communications services and telephone services over the wire, and
- wherein said transceiver further comprises:
  - a splitter circuit that couples to the wire, said splitter circuit directs incoming telephone service communications over the wire to a telephone network and directs incoming data transmission service communications over the wire to said transceiver, and couples outgoing telephone service communications and outgoing high-speed data transmission service communications to the wire.

30. A transceiver as recited in claim 29, wherein said transceiver further comprises:
- a controller, operatively connected to said switch unit, to determine which one of said first and second receivers should be selected by said switch unit.

31. A transceiver as recited in claim 29, wherein the high PAR type demodulation is DMT and the low or intermediate PAR type demodulation is CPM.

32. A transceiver as recited in claim 29, wherein the high PAR type demodulation is DMT and the low or intermediate PAR type demodulation is one of CPM, FSK, MSK or QAM.

33. A transceiver as recited in claim 29, wherein the high PAR type demodulation is DMT and the low or intermediate PAR type demodulation is one of CPM with a plurality of amplitude levels.

* * * * *